(12) United States Patent
Dalmolin

(10) Patent No.: US 11,160,217 B2
(45) Date of Patent: Nov. 2, 2021

(54) ANTI-THEFT DETERRENT HANGING DEVICE

(71) Applicant: Maria Dalmolin, Rosharon, TX (US)

(72) Inventor: Maria Dalmolin, Rosharon, TX (US)

( * ) Notice: Subject to any disclaimer, the term of this patent is extended or adjusted under 35 U.S.C. 154(b) by 0 days.

(21) Appl. No.: 16/729,248

(22) Filed: Dec. 27, 2019

(65) Prior Publication Data

US 2021/0195846 A1 Jul. 1, 2021

(51) Int. Cl.
*A01G 5/04* (2006.01)

(52) U.S. Cl.
CPC ...................... *A01G 5/04* (2013.01)

(58) Field of Classification Search
CPC ....................................................... A01G 5/04
See application file for complete search history.

(56) References Cited

U.S. PATENT DOCUMENTS

| | | | | |
|---|---|---|---|---|
| 2,938,696 A * | 5/1960 | Hinshaw | ............ | A61G 7/0503 248/215 |
| 2,957,667 A * | 10/1960 | Kughler | ............ | A22C 15/003 248/339 |
| 4,817,239 A * | 4/1989 | Campbell | ............ | E05B 1/0053 16/413 |
| 5,607,131 A * | 3/1997 | Adams | ............ | A47G 25/0614 248/215 |
| 5,816,558 A * | 10/1998 | Sommer | ............ | A01K 39/00 248/544 |
| 6,311,851 B1 * | 11/2001 | Knudsen, Sr. | ............ | A01G 5/04 211/13.1 |
| 6,575,416 B1 * | 6/2003 | Avinger | ............ | A47G 25/0614 248/215 |
| 7,000,783 B2 * | 2/2006 | Webb | ............ | B62H 3/12 211/113 |
| 7,887,017 B2 * | 2/2011 | Moran | ............ | B44C 5/00 248/339 |
| D704,834 S * | 5/2014 | Bacon | ............ | B62H 3/12 D24/128 |
| 10,517,224 B2 * | 12/2019 | Tori | ............ | A47G 29/00 |
| 2009/0057498 A1 * | 3/2009 | Oh | ............ | F16L 3/221 248/68.1 |

* cited by examiner

*Primary Examiner* — Anita M King
(74) *Attorney, Agent, or Firm* — Delphine James

(57) ABSTRACT

Provided is an anti-theft deterrent hanger device comprises a top hook member and a bottom hook member with an elongated suspension arm therebetween. The top hook member is for placement over a top of an entry way of a building structure. Both hook members face inwardly toward the entryway.

14 Claims, 3 Drawing Sheets

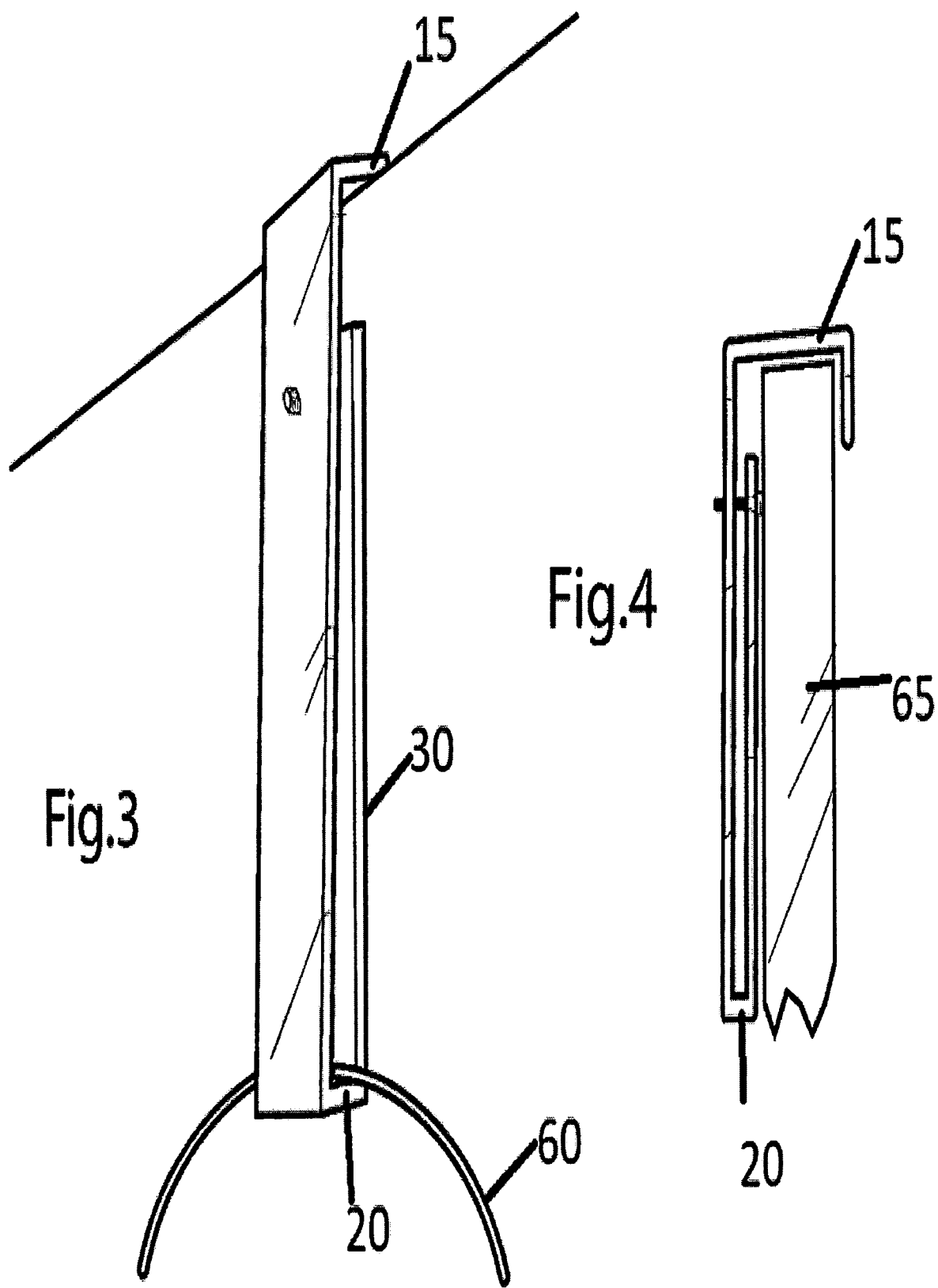

ANTI-THEFT DETERRENT HANGING DEVICE

BACKGROUND OF THE INVENTION

The doorway of a building is often the focal point of a building structure. People often decorate the front door in order to convey a particular mood or atmosphere. In the United States, this is especially true for holidays and significant events such as Valentine's Day, Easter, Fourth of July, Halloween, Thanksgiving, Christmas, and Hanukkah.

People decorate their doorways in different ways. In many cases, people purchase and use wreaths which can be a very expensive investment. There are many types of ways to hang wreaths. While current methods of hanging decorations on a door are useful, anti-theft measures are significant issues with many people. Accordingly, there is a need for a theft deterrent wreath hanger invention to assist with the prevention of wreath thefts, as this crime is currently increasing.

SUMMARY OF THE INVENTION

Provided is a hanging device for decorative items to be suspended in front of doorways. The present invention is a hanger device comprising a top hook member and a bottom hook member with an elongated suspension arm therebetween. The top hook member is for placement over a top of the door with both hook members face inwardly toward the door.

One of the major objectives of this invention is to provide a device that deters theft of beautiful and expensive decorative items suspended in front of doorways.

Another objective is to provide a device that is cost effective to manufacture and install.

Because the upper and lower hook protrudes it makes it difficult to remove the decorative item and thus theft is effectively deterred.

Together with other objects of the invention, along with the various features of novelty which characterize the invention, are pointed out with particular in the claims annexed to and forming a part of this disclosure.

BRIEF DESCRIPTION OF THE DRAWINGS

This invention is described by appended claims in relation to description of a preferred embodiment with reference to the following drawings which are described briefly as follows:

FIG. 3 illustrates the hanging device suspended from a doorway connected to a wreath; and FIG. 4 illustrates a side plan view showing device suspended from the door.

DETAILED DESCRIPTION OF THE INVENTION

Figure 1:
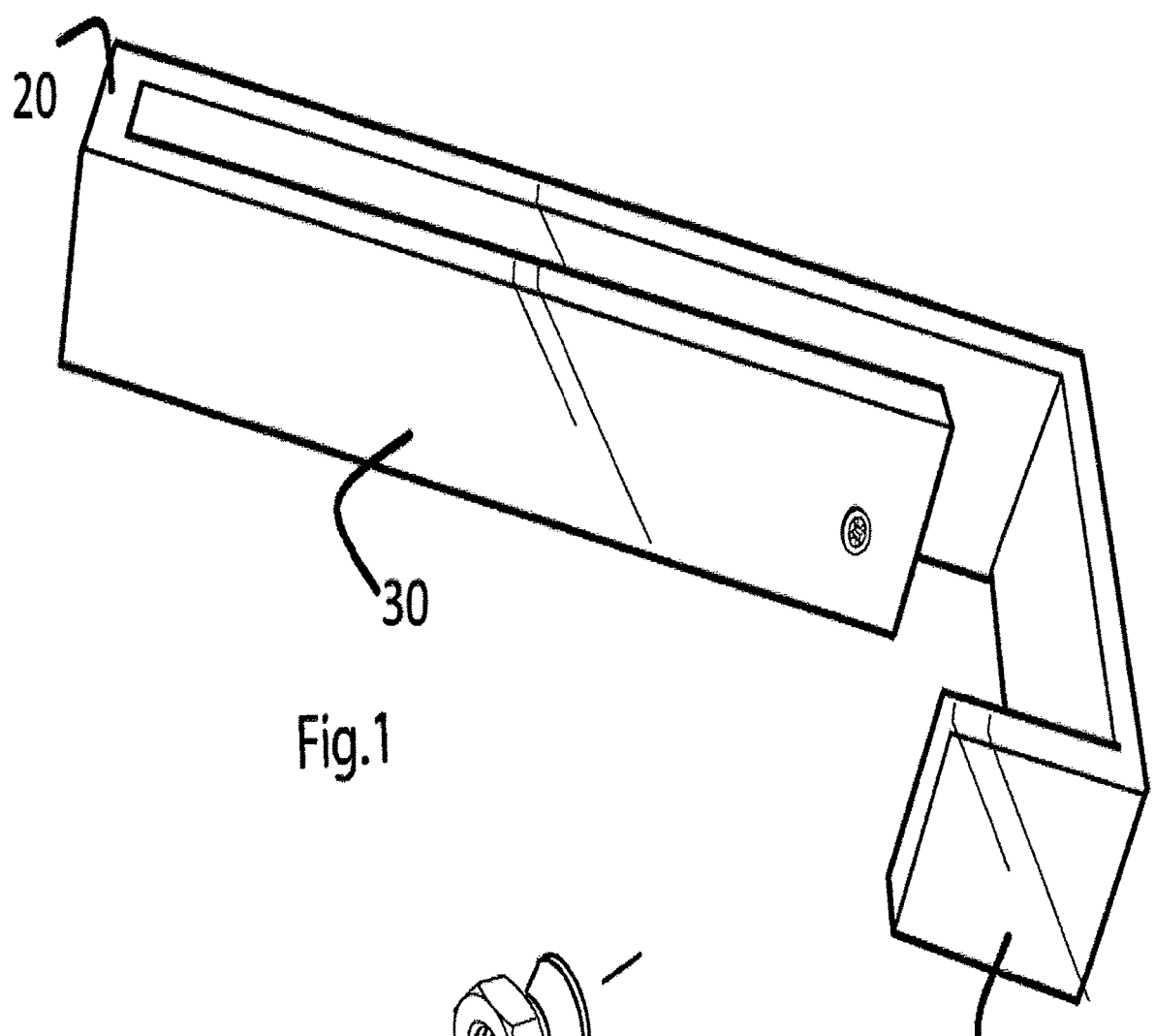
FIG. 1 is a perspective view of the hanging device.
Figure 2:
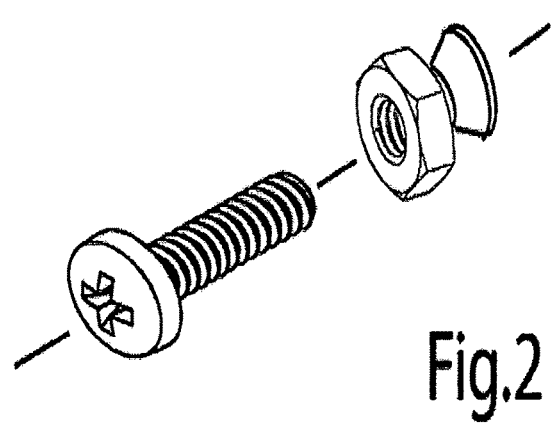
FIG. 2 is a cut away view of the tamper resistant fastener.

With reference now to the drawings, and in particular to FIG. 1 thereof hanging device embodying the principles and concepts of the present invention and generally designated by the reference numeral 10 will be described.

Figure 5B:
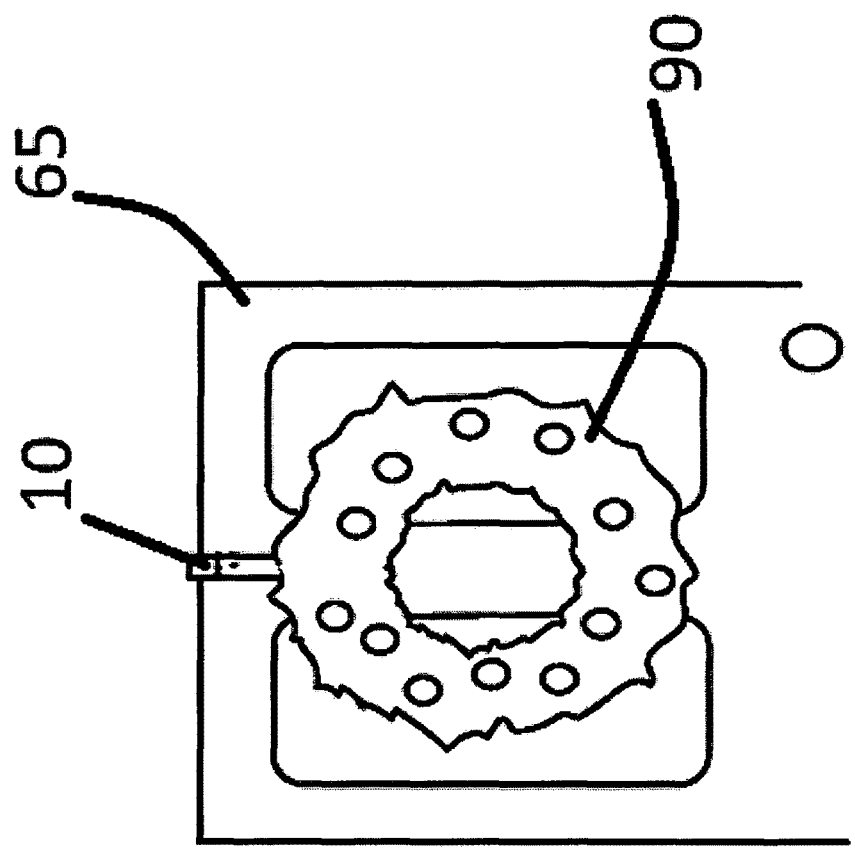
FIG. 5B is a front plan view of a wreath on the hanging device.
Figure 5A:
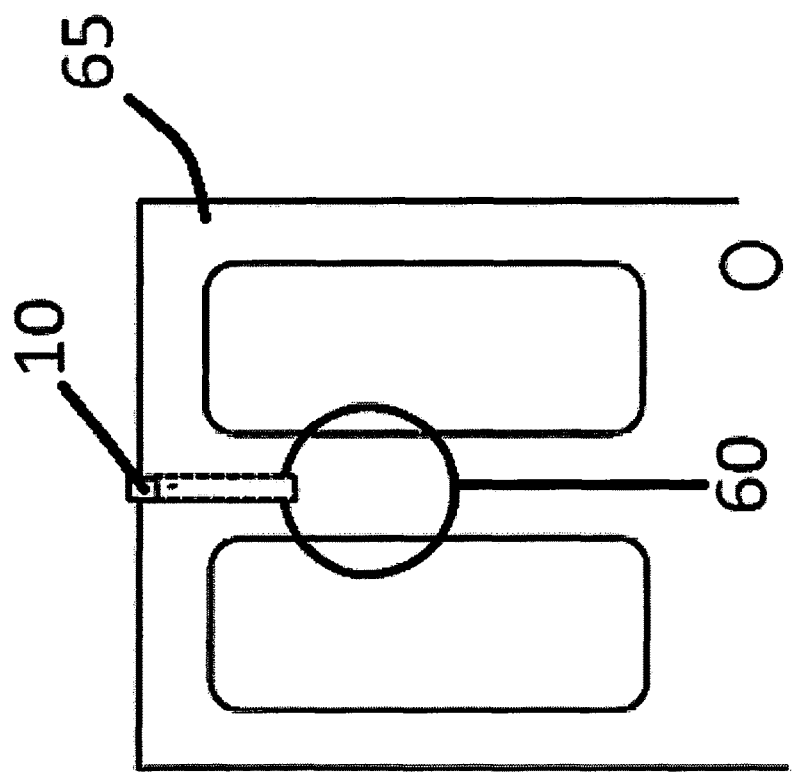
FIG. 5A is a front plan view of the device suspended from in front of the doorway.

As depicted in FIGS. 5A and 5B, the exemplary embodiments of the present invention are designed to be suspended over dwelling closures or other suitable structures such as, dwelling closures include doors, windows and other similar dwelling structures. The exemplary embodiments are suspended over these structures.

The hanging device (10) comprises a top hook member (15) and a bottom hook member (20) with a suspended arm therebetween. In the illustrated embodiment the handing device (10) is manufactured from a single sheet of flat metal. The metal can be steel, carbon fiber, Kevlan, or another suitable sturdy non-bendable material.

In the depicted embodiment the top hook member (15) has an inner loop with a sufficient to surround the top of a doorway (65). The width of a standard doorway is approximately two inches. As illustrated the top hook member (15) integrally forms a square with an inner loop to fit securely over the top of the doorway (65). The top hook member (15) forms an L shape extending longitudinally downward a short distance. Additionally, the width of the L shape of the top hook member (15) is substantially thin (0.10-0.5 inches) to fit between door spacing. Alternatively, the top hook member (15) can be configured to securely over a window frame that support outdoor decorations.

In the depicted embodiment the bottom hook member (20) has a loop to fit around a ring of a decorative item (60) or a wreath (90) as depicted respectfully in FIGS. 5A and 5B. As shown the length of the bottom hook member (20) extends longitudinally upward more than one-half the distance of the elongated arm (30) towards the top hook member. As depicted the bottom hook member has a disconnected arm that folds upward to form an opening therebetween.d As depicted the U shape of the bottom hook member (30) has a smaller loop than top hook member (15). Additionally, the width of the sheet metal can be thicker than the L shape of top hook member (15). In alternative embodiments, the U shape of the bottom hook member (30) does not have to be flat.

The elongated suspended arm is defined by an upper end and a lower end. The top hook member (15) has an L shape integrally formed by a top horizontal slit and a top vertical slit. The top horizontal slit has one end that is integrally or fixably attached to the upper end of the elongated suspended arm and horizontally extends a predetermined distance of at least two inches to an opposite end that is integrally or fixably attached to the top vertical slit which vertically extends downward along the longitudinal axis of the elongated suspended arm to a pre-determined distance of at least 2 inches.

The bottom hook member (30) has a U shape integrally formed by a bottom horizontal slit and a bottom vertical slit. The bottom horizontal slit has one end that is integrally or fixably attached to the upper end of the elongated suspended arm and horizontally extends a predetermined distance of at least ½ inch to an opposite end that is integrally or fixably attached to the bottom vertical slit which vertically extends upward along the longitudinal axis of the elongated suspended arm to a pre-determined distance of at least 2 inches. In the preferred embodiment the bottom horizontal slit member extend as least one-half the length of the elongated suspended arm The top hook member extends linearly downward from the upper end of the elongated suspended arm and the bottom hook member extend linearly upward from the lower end of the elongated suspended arm.

In alternative embodiments the hanging device (10) further comprises a tamper resistant fastener which can be made of metal or strong plastic. In one depicted embodiment, the fastener can include a threaded screw with an attaching nut. The screw comprises a shaft with a helical thread embedded therein. The nut attaches to one end of the threaded shaft. As shown the tamper resistant fastener extends through the upper end of the bottom hook member (30) and securely holds the wreath form in place thereby further deterring theft.

The tool can be made of steel, metals, metal alloys, and strong plastics. Strong plastics are polycarbonate, carbon fiber, Kevlar and other types of strong plastics that are as strong as steel.

Alloys are combinations of metals, and the main reason for making alloys is to produce a stronger material. The most important alloy is steel, which is a combination of iron and carbon and is much harder than either of its two elemental components. Metallurgists create alloys of most metals, even steel, and they belong on lists of the hardest metals.

Below is a List of Metals and Alloys that are Very Strong.

Carbon Steel—This common alloy of iron and carbon has been in production for centuries and scores highly for all four qualities that define strength. It has a yield strength of 260 mega pascals (Mpa) and a tensile strength of 580 Mpa. It scores about 6.0 on the Mohs scale and is highly impact resistant.

Steel-Iron-Nickel Alloy—There are a few variations of this alloy, but in general, alloying carbon steel with nickel increases the yield strength to as much as 1,420 MPa and the tensile strength to as much as 1,460 Mpa.

Stainless Steel—An alloy of steel, chromium and manganese produces a corrosion-resistant metal with yield strength of up to 1,560 Mpa and a tensile strength of up to 1,600 Mpa. Like all types of steel, this alloy is highly impact resistant and scores mid-range on the Mohs scale.

Tungsten—With the highest tensile strength of any naturally occurring metal, tungsten is often combined with steel and other metals to create even stronger alloys. Tungsten is brittle, however, and shatters under impact.

Tungsten carbide—An alloy of tungsten and carbon, this material is commonly used for tools with cutting edges, such as knives, circular saw blades and drill bits. Tungsten and its alloys have typical yield strengths from 300 to 1,000 Mpa and tensile strengths from 500 to 1,050 Mpa.

Titanium—This naturally occurring metal has the highest tensile strength to density ratio of any metal, which makes it, pound-for-pound, stronger than tungsten. It scores lower on the Mohs scale of hardness, though. Titanium alloys are strong and lightweight and are often used in the aerospace industry.

Titanium aluminide—This alloy of titanium, aluminum and vanadium, has a yield strength of 800 Mpa and a tensile strength of 880 Mpa.

Inconel—A superalloy of austenite, nickel and chromium, inconel retains its strengths in extreme conditions and high temperatures, making it suitable for high-speed turbines and nuclear reactor applications.

Chromium—If you define a metal's strength simply on the basis of how hard it is, then chromium, which scores 9.0 on the Mohs scale, would top your list. By itself, it isn't as strong as other metals in terms of yield and tensile strength, but it is often added to alloys to make them harder.

Iron—One of the components of steel, and the go-to metal for tool and weapon makers throughout the ages, iron completes the list of the world's strongest metals. Cast iron scores about 5 on the Mohs scale, and its yield and tensile strengths are about 246 and 414 Mpa respectively.

What is claimed is:

1. A hanger device for securing a decorative item to an entry into a building, the device comprising:
    an integrally formed body;
    the body defined by a top hook member and a bottom hook member with a first elongated suspension arm there between;
    the first elongated suspension arm being solid and contiguous;
    the hanger device being made from a strong durable and non-breakable material;
    the top hook member having a top loop configured with a depth for placement over a top of an entry;
    the bottom loop member having a second elongated arm extending upwardly and;
    the bottom hook member and the top hook member facing inwardly toward the entry.

2. The hanger device of claim 1 wherein the top hook member has a first loop with a wider depth than a second loop of the bottom hook member.

3. The hanger device of claim 2 wherein the second loop is perpendicularly aligned at an upper end of the first elongated suspension arm.

4. The hanger device of claim 2 wherein the first loop is perpendicularly aligned between a lower end of the first elongated suspension arm and the second elongated arm.

5. The hanger device of claim 1 wherein the hanger device is manufactured from a material selected from the group consisting of metal, metal alloy or strong plastic.

6. The hanger device of claim 1 wherein the hanger device is made of carbon fiber.

7. The hanger device of claim 1 wherein the hanger device is made of a durable, nonbreakable, and flexible material.

8. The hanger device of claim 1 wherein the top loop has a depth of at least 2 inches.

9. The hanger device of claim 1 wherein the second elongated arm of the bottom loop extends upwardly a length greater than half the length of the first elongated suspension arm.

10. The hanger device of claim 9 wherein the fastener member is tamper-resistant.

11. The hanger device of claim 1 further comprising a fastener member to securely attach a top portion of the first elongated arm to the elongated suspension arm.

12. The hanger device of claim 1 wherein the first elongated suspension arm has a flat surface.

13. The hanger device of claim 1 wherein the second elongated arm of the bottom hook member has a flat surface.

14. The hanger device of claim 1 wherein the bottom hook member has a pre-defined depth to receive an ornamental wreath.

* * * * *